United States Patent
Merz

[15] 3,640,637
[45] Feb. 8, 1972

[54] ADJUSTABLE MACHINE REAMER

[72] Inventor: Adolf Merz, Olten, Switzerland

[73] Assignee: Merz AG Dulliken, Dulliken, Switzerland

[22] Filed: Dec. 24, 1969

[21] Appl. No.: 887,830

[30] Foreign Application Priority Data

Dec. 27, 1968 Austria ..........................A 12 589/68

[52] U.S. Cl..............................................408/197
[51] Int. Cl..............................................B23d 77/04
[58] Field of Search......................................77/76; 408/197

[56] References Cited

FOREIGN PATENTS OR APPLICATIONS 275,208   8/1957   Switzerland ...............................77/76

Primary Examiner—Francis S. Husar
Attorney—Woodhams, Blanchard and Flynn

[57] ABSTRACT

An adjustable machine reamer in which a screw connection is provided between the expansion member and the reamer shank, a threaded projection or attachment arranged on an extension at the rear end of the expansion member and a tapped bore formed in the reamer shank and having an internal screw thread adapted to the external screw thread on the threaded projection on the expansion member. The extension at the rear end of the expansion member and the reamer shank each have one annular, face ground bearing face thereon for aligning the longitudinal axes of the expansion member and of the shank relatively to each other. There are also provided an axial centering means having a ground centering bore in the reamer shank and a centering cylinder fitting into the centering bore on the extension at the rear end of the expansion member.

5 Claims, 3 Drawing Figures

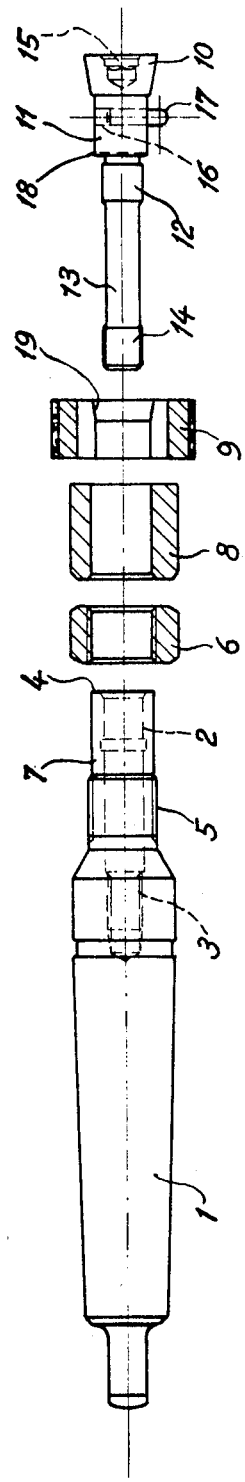
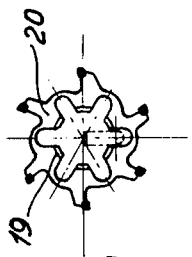
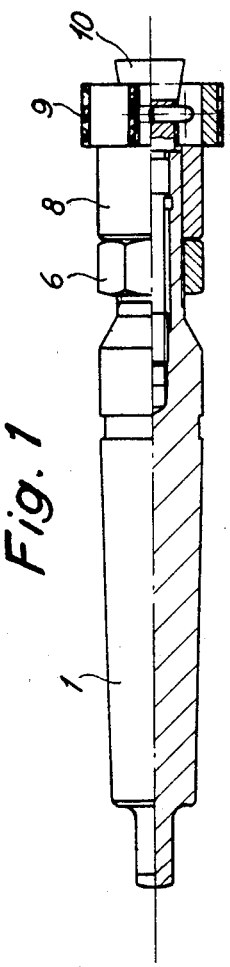
INVENTOR.
ADOLF MERZ

ADJUSTABLE MACHINE REAMER

The invention relates to an adjustable machine reamer having a reamer shank and a replaceable reaming head which is of the sleeve-ring type, is endlessly corrugated in cross section and has cutting edges arranged on shoulders formed by radial projections on the reaming head, the reaming head being resiliently tensioned between an expansion member bearing against its interior and fast with the reamer shank and a sleeve arranged for displacement on the reamer shank and supported on a nut screwed on the shank, and being radially expansible by axial displacement relative to the expansion member, being furthermore supported on the expansion member only with a forward conical portion of its inner corrugation crests.

A machine reamer of this kind is known from Swiss Pat. No. 275,208 and is there disclosed as two variants of embodiment (which are in principle equivalent) of adjustable machine reamers of the above-discussed type. The two variants differ, substantially, only in that the reaming head, in the case of a first variant, is arranged between a tapped expansion member screwed on to a threaded pin at the forward end of the reamer shank and a flange on the reamer shank, and, in the case of the second variant, between an expansion member constituting the forward end of the reamer shank and a flanged sleeve which is displaceable on the shank and supported on a nut screwed on to the shank. In the case of the first variant, therefore, the rear side of the reaming head bears firmly against a flange on the reamer shank and may be adjusted by screwing to a greater or lesser extent of the expansion member projecting from the front into the head on to the threaded pin on the reamer shank. In the case of the second variant, on the other hand, the reaming head bears firmly against the expansion member projecting into it from the front and constituting the forward end of the reamer shank and may be adjusted by displacing a flanged sleeve bearing against its rear side or by rotating a nut forming the means of supporting the flanged sleeve and screwed on to the shank. Since the reaming head, in the case of the first variant, bears, rearwardly, firmly against the reamer shank and, in the case of the second variant, bears forwardly firmly against the reamer shank or the expansion member constituting the forward end thereof, the reaming head may, when assembling the reamer, in the case of the first variant be pushed from the front on to the reamer shank or the threaded pin at the forward end of the reamer shank, whereas in the case of the second variant the reaming head must, on assembling the reamer, be pushed from the rear over the entire shank, in which case subsequently the flanged sleeve is pushed on and then the nut provided for supporting the same is screwed on to the shank. From this it will be clear that the second variant is suitable, practically speaking, only for embodiments of the machine reamer wherein the inner aperture width of the sleeve-ringlike reaming head is larger than the largest diameter of the reamer shank in the zone between the rear end of the reamer shank and the expansion member arranged at its forward end, whereas, in contradistinction thereto, in the case of the first variant the only precondition is that the outer diameter of the reaming head should be larger than the largest diameter of the reamer shank. Thus, the second variant was suitable only for relatively large reamer diameters whereas the second variant required to be used with relatively small and medium reamer diameters.

However, the first variant affords, as compared with the second variant, a lesser degree of accuracy with regard to the circular twist of the reaming head, due to the fact that an expansion member screwed on to a threaded pin does not, even if the threads of the tapped bore in the expansion member and of the threaded pin on the reamer shank are ground, afford centering which is as satisfactory as that provided by an expansion member connected in one piece with the reamer shank, in accordance with the second variant, and since furthermore, in the case of an expansion member screwed on to a threaded pin, there is a possibility that the longitudinal axis of the expansion member and the longitudinal axis of the reamer shank or of the threaded pin on the reamer shank may not be accurately aligned relatively to each other, for example because the distribution of the pressure points between the external screw thread in the expansion member and the external screw thread on the threaded pin is not entirely uniform in the peripheral direction.

Within the framework of progressively increasing automation of industrial manufacture, however, there is a progressive increase precisely in respect of demands made with regard to the maximum permissible circular twist in machine reamers, in particular also within the range of smaller and medium reamer diameters for which, hitherto (for the reasons mentioned hereinabove) only the first variant was suitable. Now, it would theoretically be possible to satisfy these increased demands by going over to the second variant also within the range of relatively small and medium reamer diameters. This, however, would mean that it would be necessary to greatly diminish the shank diameter so as to make the second variant possible also in the case of small and medium reamer diameters. This, however, is opposed by the factor that, first of all for strength and stability reasons and secondly also due to the conversion involved thereby of the machine equipment of the industry to correspondingly smaller-dimensioned holders for the reamer shank, a diminution in this manner of the shank diameter could not be considered.

Thus, it was the problem on which the invention is based to provide an adjustable machine reamer which, on the one hand, has the advantages of the said second variant with regard to accurate centering and alignment relatively to each other of the longitudinal axis of the expansion member and of the longitudinal axis of the reamer shank, and therewith of the extremely small circular twist achievable thereby and, on the other hand, however, does not, as in the case of the said second variant, require that the reaming head should be pushed on from the rear over the entire reamer shank or that the inner aperture width of the reaming head should be larger than the shank diameter at its largest point.

According to the invention, this is achieved with a machine reamer of the type mentioned at the outset, characterized by a screw connection between the expansion member and the reamer shank, having a threaded projection or attachment arranged on an extension at the rear end of the expansion member and a tapped bore formed in the reamer shank and having an internal screw thread adapted to the external screw thread on the threaded projection on the expansion member, there being in each case one annular, face ground bearing face on the extension at the rear end of the expansion member and on the reamer shank, for alignment of the longitudinal axes of the expansion member and of the shank relatively to each other, an axial centering means having a ground centering bore in the reamer shank and a centering cylinder fitting into the centering bore on the extension at the rear end of the expansion member.

Advantageously, with this arrangement, the bearing face on the reamer shank may be constituted by the forward end of the reamer shank and the bearing face on the extension or prolongation at the rear end of the expansion member may be formed by a step on the said extension.

Furthermore, each of the two annular bearing faces may expediently be arranged in the zone of one end of the centering bore or of the centering cylinder, so that at least the bearing face arranged in the zone of one end of the centering cylinder may be ground in the same working step with the grinding of the centering cylinder.

A preferred embodiment of the present machine reamer has a conical expansion member having a cylindrical projection or attachment forming a first portion of the extension at the rear end of the expansion member of smaller diameter than the inner aperture width of the reaming head, a step, constituting the annular bearing face on the extension, at the rear end of the cylindrical projection, a second portion of the extension constituting the centering cylinder and adjacent the first portion, an intermediate member adjacent the centering cylinder and having a diameter smaller than that of the centering cylinder, and an end member, constituting the threaded projection, of the extension, and also an appropriate arrangement of the centering bore and of the threaded bore in the reamer shank. Advantageously, with this arrangement, in order to achieve maximum accuracy in the centering of the expansion body, the intermediate member and the centering cylinder may, together, be longer than the conical expansion body and the cylindrical projection.

The invention will now be discussed in greater detail with reference to an example of embodiment and with reference to the accompanying figures, wherein:

FIG. 1 shows an example of embodiment of a machine reamer according to the invention;

FIG. 2 shows the individual elements of the machine reamer, illustrated in FIG. 1, before the assembly thereof;

FIG. 3 shows a front elevation of the reaming head of the machine reamer shown in FIGS. 1 and 2.

The machine reamer shown in FIG. 1 consists, as FIG. 2 shows, of a reamer shank 1 having a ground centering bore 2 and a tapped bore 3 and also a face-ground annular bearing face 4 at its forward end, a nut 6 which is adapted to be screwed on the external screw thread 5 on the reamer shank 1, a sleeve 8 supported through the agency of its rear end on the nut 6 and adapted to be pushed on to the ground forward end 7 of the reamer shank 1, the reaming head 9 and the expansion member 10 provided with an extension at its rear end and having a cylindrical projection 11, a centering cylinder 12, an intermediate member 13 and a threaded projection or attachment 14.

The expansion member 10 is provided at its front side with a hexagonal aperture 15 for tightening the screw connection between the expansion member 10 and the reamer shank 1. The cylindrical projection 11 at the rear end of the expansion member 10 is formed with a radial bore 16 into which is pushed a drive pin 17 serving for the purpose of establishing a connection which is fast in rotation between the cylindrical projection 11 or the expansion member 10, in one piece therewith, and the reaming head 9, as will be apparent, in detail, from the front view of the reaming head shown in FIG. 3.

For the assembly of the reamer, first of all the nut 6 is screwed on to the screw thread 5 and, subsequently, the sleeve 8 is pushed on to the front end 7 of the reamer shank 1. Thereupon, the reaming head 9 is pushed on to the extension at the rear end of the expansion member 10 until it is approximately within the zone of the cylindrical projection 11. Then, the section of the extension constituted by the threaded projection 14, the intermediate member 13 and the centering cylinder 12 is introduced, at the rear end of the expansion member 10, into the bore in the reamer shank and the threaded projection 14 is screwed fast in the tapped bore 3, until the annular bearing face 18 at the rear end of the cylindrical projection 11 bears firmly on the annular bearing face 4 at the forward end of the reamer shank. When the annular bearing faces 4 and 18 are located accurately in planes through which the longitudinal axis of the reamer shank or of the expansion member extends perpendicularly (or vertically) and the plane movement of the said annular bearing faces is sufficiently small, the longitudinal axis of the expansion member is, due to the tightening action, aligned accurately relatively to the longitudinal axis of the reamer shank. Furthermore, on such tightening taking place, the longitudinal axis of the expansion member is accurately centered relatively to the longitudinal axis of the reamer shank by the centering cylinder 12 and the centering bore 2, if the circular twists of the centering cylinder 12 and of the centering bore 2 are negligibly small and the fit between the centering cylinder 12 and the centering bore 2 is extremely close.

After the securing of the screw connection between the expansion member 10 and the reamer shank 1, the nut is then screwed forwardly until the forward conical portion 19 of the inner corrugation crests 20 of the reaming head 9 bears on the expansion member 10 and (if appropriate) is widened to the desired extent. For adjustment of the reamer, it is then in every case necessary merely to so rotate the nut 6 that further widening of the forward conical portion 19 of the inner corrugation crests 20 of the reaming head 9, and therewith a corresponding enlargement of the outer diameter of the reaming head 9 at its forward end, takes place.

In the constructional design of the present machine reamers, the following points must be noted: first of all, care must be taken to ensure that the annular bearing faces 4 and 18 are located as accurately as possible within planes through which the longitudinal axes of the reamer shank or of the expansion member extend perpendicularly or vertically, i.e., care is to be taken to ensure that, on grinding the said annular bearing faces, the rotations of the reamer shank or of the expansion member take place exactly about the longitudinal axis thereof and that the grinding tool is guided exactly perpendicular to the pivoting axis. At the same time, as far as possible plane motion of the said annular bearing faces on rotation about the longitudinal axis of the reamer shank or of the expansion body is to be effected below $5\mu$ and if possible even below $3\mu$. Secondly, care is to be taken that the circular twist of the centering cylinder 12, on rotation of the expansion member 10 about its longitudinal axis and the circular twist of the centering bore 2 on rotation of the reamer shank about its longitudinal axis, is to be as small as possible. It should expediently be below $10\mu$ and if possible below $5\mu$. To this end, during the grinding of the centering cylinder 12 and of the centering bore 2, care must be taken to ensure that the expansion member or the reamer shank are rotated with maximum accuracy about their longitudinal axis and that the grinding tool is guided as far as possible exactly parallel to the pivot axis. Furthermore, it must be ensured that the diameter of the centering cylinder 12 and of the centering bore 2 expediently correspond exactly to each other, at least $10\mu$ and if possible even at less than $5\mu$. Thirdly, an intermediate member 13 will expediently be provided between the centering cylinder 12 and the threaded projection 14, so that the centering cylinder 12 and the intermediate member 13 are, together, longer than the expansion member 10 and the cylindrical projection 11. With this arrangement, the result may be achieved that nonuniform distribution of the bearing points between the threaded projection 14 and the threaded bore 3 along the periphery thereof is not able to exert any or any substantial negative influence on the centering and alignment of the longitudinal axis of the expansion member relatively to the longitudinal axis of the reamer shank. Furthermore, the intermediate member 13 has the advantage that it may, by tightening the threaded projection 14 in the threaded bore 3, be pretensioned to such an extent that the force with which the two annular bearing faces 4 and 18 are pressed one upon the other or by means of which the expansion body 10 is retained is substantially larger than any forces which may become operative on putting into use of the machine reamer in the direction of an eccentric displacement of the expansion member 10, thereby rendering such forces ineffective. Fourthly, the circular twist of the front end 7 of the reamer shank, on to which the sleeve 8 is pushed on, and furthermore also the circular twist of the bore in the sleeve 8 is to be kept as low as it possibly can be, expediently below $10\mu$ and the fit between this forward end 7 and the bore in the sleeve 8 is to be as close as possible. Furthermore, the length of the sleeve 8 is to be made as large as possible. Due to this fit of maximum closeness between the sleeve 8 and the cylindrical end 7 and the greatest possible length of the sleeve 8, the result is achieved that the longitudinal axis of the reaming head 9, the rear end of which bears on the front side of the sleeve 8, is aligned exactly relatively to the longitudinal axis of the reamer shank. The centering of the reaming head 9 is then effected by means of the expansion member 10. In order to achieve maximum accuracy in the alignment of the axis of the reaming head 9 on the longitudinal axis of the reamer shank 1, furthermore, the rear side of the reaming head and at least the front side of the sleeve 8 should be face-ground.

Using machine reamers according to the invention, with unvaried shank dimensions, it is possible, also within the range of small and medium reamer diameters, to achieve circular twist of the reaming head less than $10\mu$, this being something which hitherto had been impossible within these diameter ranges.

I claim:

1. Adjustable machine reamer having a reamer shank and having a replaceable reaming head having the shape of a sleeve ring and which, in cross section, is endlessly corrugated and which has cutting edges arranged on shoulders formed by radial projections on the reaming head, the reaming head being resiliently tensioned, between an expansion member bearing against its interior and fast with the reamer shank and a sleeve arranged for displacement on the reamer shank and supported on a nut screwed on to the shank, about the expansion member and radially extensible by axial displacement relatively to the expansion member and furthermore supported on the expansion member only through the agency of a forward, conical portion of its inner corrugation crests, characterized by a screw connection between the expansion member and the reamer shank and including a threaded projection arranged on an extension at the rear end of the expansion member and a tapped bore formed in the reamer shank and having an internal screw thread corresponding to the external screw thread on the threaded projection of the expansion member, an annular face-ground bearing face on the extension at the rear end of the expansion member and on the reamer shank for alignment of the longitudinal axes of the expansion member and the shank relatively to each other, and an axial centering means having a ground centering bore in the reamer shank and a centering cylinder on the extension at the rear end of the expansion member and fitting into the centering bore.

2. Machine reamer according to claim 1, characterized in that the bearing face on the reamer shank is formed by the front end of the reamer shank and the bearing face on the extension at the rear end of the expansion member is formed by a step on the said extension.

3. Machine reamer according to claim 1, characterized in that each of the two annular bearing faces is arranged in the zone of one end of the centering bore and of the centering cylinder.

4. Machine reamer according to claim 1 characterized in that the conical expansion member has a projection forming a first portion of the extension and located at the rear end of the expansion member, the said projection having a smaller diameter than the inner aperture width in the reaming head a step constituting the annular bearing face on the extension at the rear end of the cylindrical projection, a second portion of the extension constituting the centering cylinder and disposed adjacent the first portion, an intermediate member adjacent the centering cylinder having a smaller diameter than that of the centering cylinder, and an end member of the extension constituting the threaded projection.

5. Machine reamer according to claim 4, characterized in that the intermediate member and the centering cylinder are, together, longer than the conical extension member and the cylindrical projection.

* * * * *